United States Patent
Cheney

[11] Patent Number: 6,012,249
[45] Date of Patent: Jan. 11, 2000

[54] INSULATED PLANT COVER

[76] Inventor: Dennis Cheney, 781 W. Pleasent St., Idaho Falls, Id. 83401-5686

[21] Appl. No.: 08/990,674

[22] Filed: Dec. 15, 1997

[51] Int. Cl.⁷ .................................................... A01G 13/00
[52] U.S. Cl. .................................... 47/26; 47/30; 47/28.1
[58] Field of Search .............................. 47/26, 30.29, 21, 47/28.1, 23; 135/97, 117; 52/204.1, 171

[56] References Cited

U.S. PATENT DOCUMENTS

| | | | |
|---|---|---|---|
| D. 312,951 | 12/1990 | Forrest | D8/1 |
| D. 338,398 | 8/1993 | Mookherjee | D9/305 |
| 4,065,016 | 12/1977 | Perkins | 215/6 |
| 4,071,974 | 2/1978 | Tripp | 47/2 |
| 4,137,667 | 2/1979 | Wallace | 47/26 |
| 4,194,319 | 3/1980 | Crawford | 47/27 |
| 4,265,049 | 5/1981 | Gorewitz | 47/26 |
| 4,267,665 | 5/1981 | Wallace | 47/26 |
| 4,341,039 | 7/1982 | Reese | 47/2 |
| 4,400,909 | 8/1983 | Reese | 47/2 |
| 4,439,950 | 4/1984 | Kelley | 47/85 |
| 4,646,467 | 3/1987 | Morrisroe | 47/21 |
| 4,763,440 | 8/1988 | James | 47/2 |
| 4,821,453 | 4/1989 | Morehead | 47/2 |
| 4,901,472 | 2/1990 | Donohue | 47/2 |
| 5,044,815 | 9/1991 | Wright | 403/338 |
| 5,117,580 | 6/1992 | Brown | 47/9 |
| 5,117,582 | 6/1992 | Cissel | 47/25 |
| 5,171,390 | 12/1992 | Travers | 156/212 |
| 5,212,905 | 5/1993 | Philoctete | 47/48.5 |
| 5,235,782 | 8/1993 | Landau | 47/72 |
| 5,361,535 | 11/1994 | Morasiewicz | 47/58 |
| 5,412,905 | 5/1995 | Allison | 47/30 |
| 5,505,020 | 4/1996 | North | 47/30 |
| 5,513,466 | 5/1996 | Mercier | 47/23 |
| 5,560,486 | 10/1996 | Zak | 206/423 |
| 5,575,109 | 11/1996 | Kuntz | 47/22 |
| 5,581,935 | 12/1996 | Anderson | 47/23 |
| 5,613,320 | 3/1997 | Thomasson et al. | 47/32.1 |
| 5,669,177 | 9/1997 | Frounfelker | 47/21 |

FOREIGN PATENT DOCUMENTS

| | | | |
|---|---|---|---|
| 653935 | 11/1991 | Australia | 47/23 |
| 525 | 12/1874 | France | 47/30 OT |
| 1003303 | 3/1952 | France | 47/30 OT |
| 82449 | 12/1894 | Germany | 47/30 |
| 1580934 | 12/1980 | United Kingdom | 47/26 |

*Primary Examiner*—Michael J. Carone
*Assistant Examiner*—Fredrick T. French, III

[57] ABSTRACT

An insulated plant cover (10) having a transparent or translucent inner cylinder (12) which has an inner cylinder top (12T) and an inner cylinder bottom (12B). The inner cylinder top (12T) has an inner cylinder top chimney (12TA) positioned at a top distal end and an inner cylinder bottom spacer (12BA) positioned circumferentially along a bottom distal end and is sealably attached thereto. The insulated plant cover (10) further has a transparent or translucent outer cylinder (14) which comprises an outer cylinder top (14T) and an outer cylinder bottom (14B). The outer cylinder top (14T) has an outer cylinder top upper edge (14TA) positioned circumferentially along a top distal end and an outer cylinder bottom lower edge (14TB) positioned circumferentially along a bottom distal end. The inner cylinder (12) is positioned within the outer cylinder (14). The inner cylinder bottom edge (12BB) is sealably attached to the inner cylinder bottom spacer (12BA). During use, the insulated plant cover (10) is removably positionable over a plant (16) having the the inner cylinder bottom spacer (12BA) resting on a ground (18) for support.

3 Claims, 6 Drawing Sheets

INSULATED PLANT COVER

BACKGROUND OF THE INVENTION

1. Field of the Invention

The present invention relates to devices for protecting objects from cold or hot temperatures. More particularly, the present invention relates to a device having a double wall which is filled with a fluid that functions as an insulator protecting objects from cold or hot temperature.

2. Description of the Prior Art

The prior art has shown methods and means used to protect plants from extreme temperatures. The prior art discloses the use of an aqueous solution interposed between the plant and the surrounding environment. The aqueous solution may be confined within an envelope which surrounds a plant or an envelope close to a plant functioning to absorb heat when the surrounding environment is hot and radiate heat when the surrounding environment is cold. The water functions to weight the device preventing wind dislodgement and function as a thermal heat sink Numerous innovations for insulated plant cover have been provided in the prior art that are described as follows. Even though these innovations may be suitable for the specific individual purposes to which they address, they differ from the present invention as hereinafter contrasted.

In U.S. Pat. No. 5,560,486, titled Container Convertible for Use as a Plant Protection Cover, invented by John Zaka container (10) for storing of transporting pourable material can be converted to a plant protection device by removing a portion of the base (11) of the container to allow the peripheral wall (12) of the container to be engaged over the plant thus surrounding the plant (32). The peripheral wall is formed from a double layer with annular space (15) therebetween for receiving liquid such as water to maintain heat.

In U.S. Pat. No. 5,505,020, titled Plant Greenhouse Inventors, invented by Keith North a single plant greenhouse is described that is that is a single unit of rigid material with adjustable access ports, wherein the greenhouse provides a thermal buffer against harsh environmental conditions while enabling access to the greenhouse interior to provide ventilation, viewing and caring for a plant while maintaining a sheltered environment that can gradually be removed, allowing the plant to gradually harden itself to the outside environment without shock.

In U.S. Pat. No. 5,412,905, titled Tomato Green House, invented by Ian T Allison a single unit plant protection device in a vertical open top cone configuration is described which is fabricated from recycled plastic material to form a blanket of bubbles or dead air cells. Tinted green to aid in heat absorption while still allowing light to penetrate through to young plants. Designed to slip over an inverted 12"*33" three wire tomato cage for support. Functions as a barrier against cold, wind, insects, and disease. Maybe reversed after last frost to provide protection for balance of plant's life while a tomato cage provides structural support to plant.

In U.S. Pat. No. 5,361,535, titled Plant Protection Device, invented by Kathleen Morasiewicz, plants during an initial growth period are protected by a plurality of plastics drinks bottles arranged in a pattern surrounding an area in which the plant is growing. The drinks bottles are engaged by a locating device in the form of a flat sheet with a plurality of openings therein with each bottle being inserted into an opening to engage the locating device to hold the bottles in the pattern surrounding the area. The locating device is a central opening through which the plant can grow and a generally circular outer peripheral edge.

In U.S. Pat. No. 5,235,782, Titled Cover for Potted Plants and Method for Covering Potted Plants, invented by Simcha Landau, an improved cover for potted plants and method for covering potted plants is described. The cover provides a water tight seal at its base while at the same time protecting the plant from contact with water leaking out of the plant. The cover is in the form of a flat, tear-away bag that customers of florists and plant nurseries can use themselves without assistance.

In patent number, titled Container for Living Flowers, invented by Inventors, Braja D Mookherjee, a plant base cover and plant basket liner, each including a layer of an absorbent material adhesively bound to a netting that is preferably formed of a durable material such as nylon. The plant base cover includes a passage for admitting the base of a plant therethrough and a cut extending from an edge of the plant base cover to the edge of the passage to facilitate placement of the plant base cover around a plant. The plant basket liner is specifically sized and configured to be placed within conventionally-known plant baskets and is adapted to maintain a quantity of soil therein. The process of fabricating both the plant base cover and plant basket liner includes the steps of forming a layer of the insulating and absorbent material, securing a netting over the layer, and spraying the layer and the netting to adhesively bind them together.

In U.S. Pat. No. 5,117,582, titled Tree Irrigator, invented by W. Lambert Cissel, Michael J. Johnson, W. Lambert Cissel, Jr. a tree irrigator utilizes at least a first flexible tree encircling container which may receive a substantial volume of a tree irrigating liquid and which will slowly disperse the liquid to the tree over a period of time. Each flexible container has at least a base portion which provides for the discharge of the irrigating liquid to the root ball of the tree. Either a single container may be placed about the trunk of the tree or two cooperating containers can be joined together in a tree encircling configuration.

In U.S. Pat. No. 5,117,580, titled Heat Transfer Tube for a Seedbed Cover, Marvin Brown; a heat transfer tube extends along the peak of a dike having at least two rows of seedlings for collecting heat from the sun during the daytime and transferring the collected heat to the soil at night. The tube is of a geometrical configuration, preferably oval, and is made of transparent plastic. The tube is secured or in intimate contact on opposite sides to a mulching sheet made of opaque plastic, preferably black plastic during the winter growing season, and white plastic during the summer growing season. Optionally, a drip irrigation line is formed separately form or integrally with the heat transfer tube to irrigate the at least two rows of seedlings located on the peak of a dike.

In patent number D312,951, titled Plant Protector, invented by Andrea Forrest the ornamental design for a plant protector, as shown and described.

In U.S. Pat. No. 4,901,472, titled Method and Apparatus for the Protection of Citrus Trees from Frost Damage, invented by Thomas P. Donohue, Richard, and Ladysmith Fritz, a frost protective device for citrus trees having a pad of thick, dark colored, water-repellent urethane foam which may be wrapped in a cylinder around the budunion or branch of a citrus tree and secured in position using VELCRO(TM), or a similar fastener. Each protective device has a plurality of insulated pockets which receive individual exothermic heat sources such as dry-chemical warmers capable of producing high temperatures for a period of 1–3 days. To protect young trees from high initial temperatures and prolong the effective duration of the heat sources, other measures are utilized in combination with the protective device. One measure is controlling the exposure of the dry chemical packet to oxygen by varying the air flow properties of the insulating pocket or the air-tight wrapper initially enclosing the heat source, thereby regulating the resulting oxidation. Another measure consists of placing an insulating jacket of liquid-filled tubes between the heat sources and the tree, so that the liquid absorbs the excess initial heat and acts as a regulator and insulator for the transfer of subsequent heat to the tree, thereby preventing initial heat damage, conserving excess initial heat energy, absorbing and releasing that heat energy to prolong the effective usefulness of heat sources, and providing backup protection due to the potential heat of fusion of the liquid.

In U.S. Pat. No. 4,821,453, titled Plant Protecting and Growth Enhancing Device, invented by James B. Morehead, a plant protecting and growth enhancing device is disclosed for use in providing an environment immediately surrounding a plant to protect the plant from atmospheric changes during its early life of growing. The plant protector is a rigid, conical, transparent device that is adapted to contain a fluid that may absorb thermal energy from an outside source and may release that absorbed thermal energy at another time. The device is adapted to be placed over a seedling plant as the plant is planted and is capable of protecting the plant from frost or other possible detrimental conditions until the plant has a chance to become established. The fluid within the device may be drained onto the plant when the device is no longer needed.

In U.S. Pat. No. 4,763,440, titled System and Method for Protecting Plants from Freeze Damage, invented by Gregory S. James a system and method for protecting a ground plot of foliage plants or the like from freezing contemplates a series of ground-level sprinklers throughout the plot and a shade cloth covering of the type having uniformly dispersed openings therein. Elevated sprinklers are provided above the shade cloth and ground-level sprinklers. During periods of freezing ambient temperatures, water is sprinkled through the elevated sprinklers whereby the water freezes in the openings of the covering and holds heat released during operation of the ground-level sprinklers under the covering. When the water droplets freeze into a thin sheet of ice on the covering, the ground-level sprinklers are turned on.

In U.S. Pat. No. 4,646,467, titled Weather Resistant Cover Bag for Dormant Plants, invented by John P. Morrisroe, a cover to protect plants, such as rosebushes, azaleas, rhododendrons and the like, against winterkill and to maintain the plants in a dormant state is provided in the form of a multilayer bag with an air space between the layers, skirts or flaps at the mouth of the bag adapted to be covered with earth and a drawstring for closing the mouth of the bag around the crown of the plant. The layers of the bag permit air and vapor to breathe therethrough, but the bag is impervious to rain, snow, ice and strong air blasts. An inner layer of the bag is opaque and dark colored, preferably black, to keep the plant in a dark environment so as not to encourage premature growth. An outer layer of the bag is light colored, preferably white, to reflect the winter sun's rays. The materials forming the layers of the bag are nonwoven spun-bonded textile fabrics. The bag is formed by superimposing a pair of spun-bonded nonwoven textile fabric sheets, stitching the sheets together along one longitudinal edge thereof, folding the sheets at the transverse center thereof, stitching together the folded-over opposite longitudinal edge and the overlapped ends. The stitching of the overlapped ends is terminated short of the opposite stitched together longitudinal edge. The fold is slit to the same level as the terminated stitching thereby providing a pair of flaps at the mouth of the bag. The bag is sliced to form belt loops therearound above the flaps. The bag is then turned inside out. A drawstring is threaded through the bolt loops or a tube stitched around the bag.

In U.S. Pat. No. 4,439,950, titled Integral Plant Container and Cover, invented by Albert W. Kelley, a plant container adapted to be fabricated from an integral blank of plastic sheet material and comprising a bottom wall, a peripheral side wall upstanding about the bottom wall, and a cover of a plurality of flaps extending laterally inwardly from the side wall with opposed flaps terminating short of each other to define therebetween a central passageway for the stem of a plant, the flaps being spaced below the top of the side wall to effectively limit the quantity of falling water received in the container by causing excess to overflow.

In U.S. Pat. No. 4,400,909, titled Plant Protector with Heat Sink and Pesticide Packet, invented by Stanton L. Reese, a method and device for applying pesticides to growing plants or portions of plants is described in which an area to be protected is enclosed and a small amount of pesticide contained in a packet is placed within the enclosure. The packet protects the pesticide from loss or destruction by water and permits pesticide vapors to escape at a rate sufficient to make the enclosed area untenable to certain pests for an extended period of time. The packet is preferably made from low density polyethylene, an ethylene-vinyl acetate copolymer or a combination of the two, and the pesticide is preferably a diethyl phosphorothioate insecticide. In the preferred embodiment of the device, the device also acts as an insulator and includes liquid receiving pockets to act as "heat sinks" to protect the trunk from below freezing temperatures.

In U.S. Pat. No. 4,341,039, titled Self-adjusting Plant Insulator with Liquid Container, invented by Stanton L. Reese, an insulating device or insulator for trunks of trees or plants is described that provides protection and thermal insulation against damaging cold during their tender years. This device is adjusted for fit about the trunk by the trunk itself as it increases in girth, thus providing effectiveness for several years without attention. The insulating device is weather resistant, protecting the young trunk from both wind damage and the effects of water from rain or irrigation. The device also protects the trunk against bark chewing rodents and prevents sprouting along the lower trunk. A preferred embodiment of the device includes liquid receiving pockets that act as "heat sinks" to protect the trunk from below freezing temperatures.

In U.S. Pat. No. 4,267,665, titled Double Walled Thermal Protective Coverings, invented by Volney Wallace, Carlos F. Pinkham thermal protective coverings for plants are provided by a double walled insulative device closable at the top and adapted to fit about the plant wherein the insulative space within the walls is filled with water or water and air.

In U.S. Pat. No. 4,265,049 titled Temporary Plant Covers, invented by Lynda Gorewitz, a reusable temporary cover for indoor house plants to retain moisture for the plant. The cover is formed of flexible transparent plastic sheet material with tie means to completely enclose a house plant and includes a water retention portion to catch and store excess water. By enclosing the plants after watering, a terrarium effect is produced and moisture is retained within the cover for a long period of time.

In U.S. Pat. No. 4,194,319, titled Potted Plant Support, invented by Carroll O. Crawford, a device for supporting a plurality of potted plants or the like, including a vertical support frame member having a hollow internal chamber, a plurality of radially extending frame members connected to the upper end of said vertical support and a plurality of lower radial frame members for engaging potted plants, an inlet means for receiving a source of water under pressure and a plurality of nozzle openings connected to the upper portion of the vertical support member. The device allows for the care of plants to include watering nozzles and a protective cover disposed over the upper frame members to properly shade the plants as required. The device may be connected to a city water supply with a hose or the like or have a permanent conduit installation which allows water flow into the center vertical member. Plants in pots are hung along the lower radial frame members. The protective cover is selected to provide a desired amount of sun or shade and may even be waterproof to prevent random amounts of rainfall to strike the plants. The cover also protects the plants from wind or other elements.

In U.S. Pat. No. 4,137,667 Wallace, titled Thermal Protective Coverings, invented by Volney Wallace, Carlos F. Pinkham, protective coverings for growing plants, food storage shelters, greenhouses and other structures provided by creating a relatively dead air space around the protected object with a device for deploying a canopy of water over and around said object.

In U.S. Pat. No. 4,071,974, titled Thermal Retaining Garden Water Blanket, invented by Ralph N. Tripp, Jr., thermal energy retaining means for use in covering soil adjacent growing plants and including a water tight elongated tubular sleeve enclosure having support means at opposed ends thereof. The support means consist of planar means or generally inverted "U" shaped configurations, and each comprising a pair of generally parallelly disposed legs spaced apart by an upper fixed cross-member. A second cross-member, slidably coupled to the legs of the inverted "U" shaped bracket is provided which extends generally parallel to the upper cross-member to form a jaw to receive the tubular sleeve material therebetween. After filling with water, the width of the tubular sleeve material is placed within the jaw of the hanger means, the hanger means then being rotated about the sleeve so as to seal the ends of the sleeve and adjust the axial length thereof In U.S. Pat. No. 4,065,016, titled Compound Vessel, invented by David R. Perkins, a compound vessel is provided which has many decorative and functional applications. The compound vessel is formed of a transparent material and has a spheroidal main body. The main body is comprised of spheroidal inner and outer walls with an annular space defined therebetween. The annular space constitutes an outer vessel of the compound vessel and the space contained by the inner wall constitutes an inner vessel of the compound vessel. The outer and inner walls join at one extremity of the spheroidal main body of the compound vessel to close the outer vessel and form the periphery of a generally circular mouth opening into the inner vessel, the inner vessel being otherwise closed. The outer wall terminates at an opposite extremity of the spheroidal main body of the compound vessel to form the periphery of a generally circular mouth opening into the outer vessel, the outer vessel being otherwise closed.

The above patented inventions differ from the present invention because they fail to describe or claim at least one combination of the following features depicted in the present invention, ridged construction, self supporting, open bottom, sealable top, inlets to permit filling a void between an inner cylinder and an outer cylinder with a fluid, and manufactured from a clear permitting sun light to reach the plant.

Numerous innovations for insulated plant cover have been provided in the prior art that are adapted to be used. Even though these innovations may be suitable for the spec individual purposes to which they address, they would not be suitable for the purposes of the present invention as heretofore described.

SUMMARY OF THE INVENTION

Annual plant and newly started perennials are planted as early in the spring as possible in order to provide as long of a growing season as possible. Often, this is done at some risk of a late frost. Typically a late frost is a well-forecast phenomenon which occurs rarely but can have a significant impact on the growth of a crop. While various method are used to protect plants often, the protection is haphazard and of little effect. What is needed is a device which protects a plant from the extreme effects of heat and cold yet is so inexpensive to produce that the farmer can afford one for each plant.

The types of problems encountered in the prior art are protecting plants from the effects of extreme temperatures.

In the prior art, unsuccessful attempts to solve this problem were attempted namely: insulation devices which surround a plant, and devices placed near a plant which radiate or absorb thermal energy. However, the problem was solved by the present invention because the present invention has a pair of concentric cylinders which surround the plant. The void between the cylinders is filled with a liquid such as water and provides thermal insulation. The bottom of the cylinders are open functioning to receive the plant. The present invention is self supporting with and without a liquid in the void.

Innovations within the prior art are rapidly being exploited to extend the growing season by providing an early start to growing plants.

The present invention went contrary to the teaching of the art which teach flexible structures and multiple containers surrounding a plant by providing a rigid structure having a fluid layer between spaced apart concentric shells.

The present invention solved a long felt need for an effect device which protects plants from temperature extremes early in the season.

The present invention produced unexpected results namely because heat is retained longer and moisture is retained the plants grow quicker and when set out are more mature. This results in mature fruit earlier shortens the fruit bearing time.

Accordingly, it is an object of the present invention to provide an insulated cover for a plant.

More particularly, it is an object of the present invention to provide a water filled shell around a plant which functions to temper low temperature fluctuations.

In keeping with these objects, and with others which will become apparent hereinafter, one feature of the present invention resides, briefly stated, in an inner cylinder spaced apart from an outer cylinder.

When the insulated plant cover is designed in accordance with the present invention, a water shell surrounds a plant. The outer shell is clear permitting sunlight to illuminate the plant and warm the water between the inner cylinder and outer cylinder.

In accordance with another feature of the present invention, an inner cylinder top has an inner cylinder top chimney which supports an inner cylinder top chimney lid which is sealed to the inner cylinder top chimney Another feature of the present invention is that an outer cylinder has outer cylinder top upper edge opening permitting a user to fill the void between the inner cylinder and outer cylinder with a liquid such as water.

Yet another feature of the present invention is that the fluid functions as a thermal sink to even the temperature variation.

Still another feature of the present invention is that when the insulated plant cover is placed over a plant sun light shines on the plant and warms the shell of water which stores thermal energy.

Yet still another feature of the present invention is that when the sun sets the stored thermal energy is radiated from the water shell keeping the plant warm when the surrounding ambient temperature drops below that of the water shell.

Still yet another feature of the present invention is that the sealed inner cylinder top chimney lid prevents warm air and moisture from escaping.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10 - insulated plant cover (10)
12 - inner cylinder (12)
12T - inner cylinder top (12T)
12TA - inner cylinder top chimney (12TA)
12TAA - inner cylinder top chimney lip (12TAA)
12TAC - inner cylinder top chimney lid (12TAC)
12B - inner cylinder bottom spacer (12B)
12BA - inner cylinder bottom spacer (12BA)
12BB - inner cylinder bottom edge (12BB)
14SL - outer cylinder stacking lip (14SL)
14 - outer cylinder (14)
14T - outer cylinder top (14T)
14TA - outer cylinder top upper edge (14TA)
14TAA - outer cylinder top upper edge opening (14TAA)
14TB - outer cylinder bottom lower edge (14TB)
14B - outer cylinder bottom (14B)
14BB - outer cylinder bottom lower edge (14BB)
16 - plant (16)
18 - ground (18)
15 - air space within the inner cylinder (15)

DESCRIPTION OF THE PREFERRED EMBODIMENT

Referring now to FIGS. 1–6, 1A–3A, 5A and 6A, together. The insulated plant cover (10) comprises a transparent or translucent inner cylinder (12). The translucent inner cylinder (12) comprises an inner cylinder top (12T) and an inner cylinder bottom (12B). The inner cylinder top (12T) comprises an inner cylinder top chimney (12TA) which is positioned at a top distal end of the inner cylinder top (12T).

The inner cylinder top chimney (12TA) further comprises a inner cylinder top chimney lip (12TAA) circumferentially there around. The inner cylinder top chimney (12TA) further comprises an inner cylinder top chimney lid (12TAC) which is removably positionable thereon.

When it is desired to prevent freezing within the insulated plant cover (10), the inner cylinder top chimney (12TA) may have a diameter selected to be equal to a standard diameter of a margarine container so that the inner cylinder top chimney lid (12TAC) can be a margarine container lid.

An inner cylinder bottom edge (12BB) positioned circumferentially along a bottom distal end of the inner cylinder bottom (12B). An inner cylinder bottom spacer (12BA) is positioned circumferentially along the inner cylinder bottom edge (12BB) positioned.

The insulated plant cover (10) further comprises a transparent or translucent outer cylinder (14). The transparent or translucent outer cylinder (14) comprises an outer cylinder top (14T). The outer cylinder top (14T) comprises an outer cylinder top upper edge (14TA). The outer cylinder top upper edge (14TA) is positioned circumferentially along a top distal end of the outer cylinder top (14T). An outer cylinder bottom lower edge (14TB) positioned circumferentially along a bottom distal end of the outer cylinder top (14T). The outer cylinder top upper edge (14TA) further comprises at least one outer cylinder top upper edge opening (14TAA) which functions to allow a user to add water between the inner cylinder (12) and the outer cylinder (14). The outercylinder (14) has a stacking lip located between (14B) and (14T) at (14SL).

The outer cylinder bottom (14B) comprises an outer cylinder bottom lower edge (14TB) positioned circumferentially along a lower distal end. The outer cylinder bottom lower edge (14TB) is sealably attached to the inner cylinder bottom edge (12BB).

During use, the insulated plant cover (10) is removably positionable over a plant (16) having the inner cylinder bottom edge (12BB) and the outer cylinder bottom lower edge (14TB) resting on a ground (18) for support.

The insulated plant cover (10) is constructed from a tranparent or translucent material selected from a group consisting of glass, plastic and plastic composite.

Figure 1:
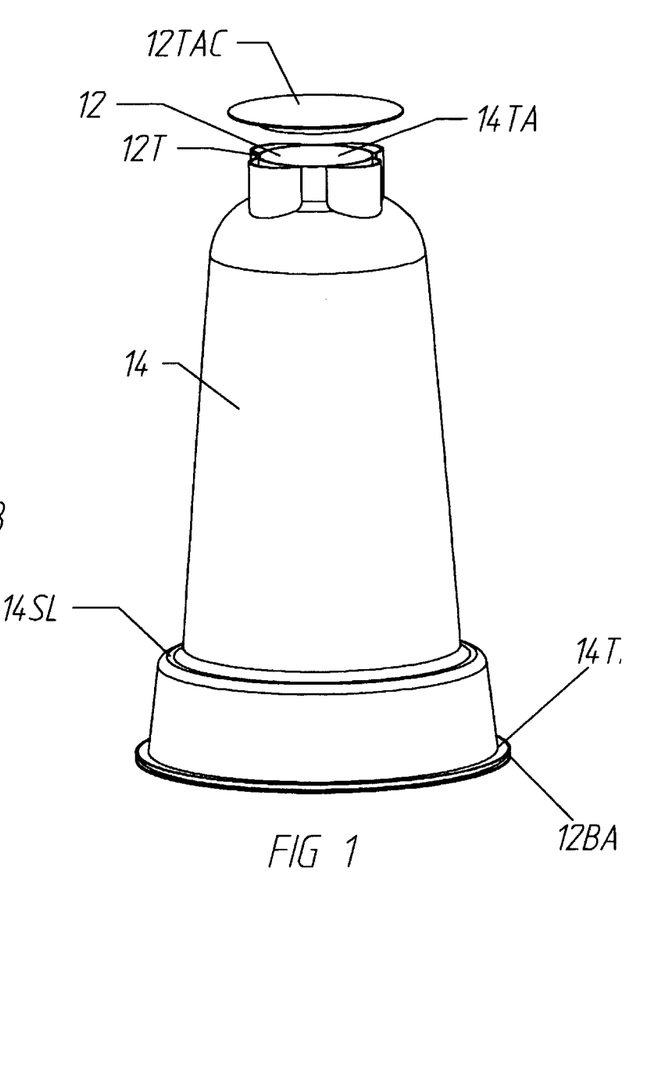
FIG. 1 is a side view of an insulated plant cover (10).
Figure 1A:
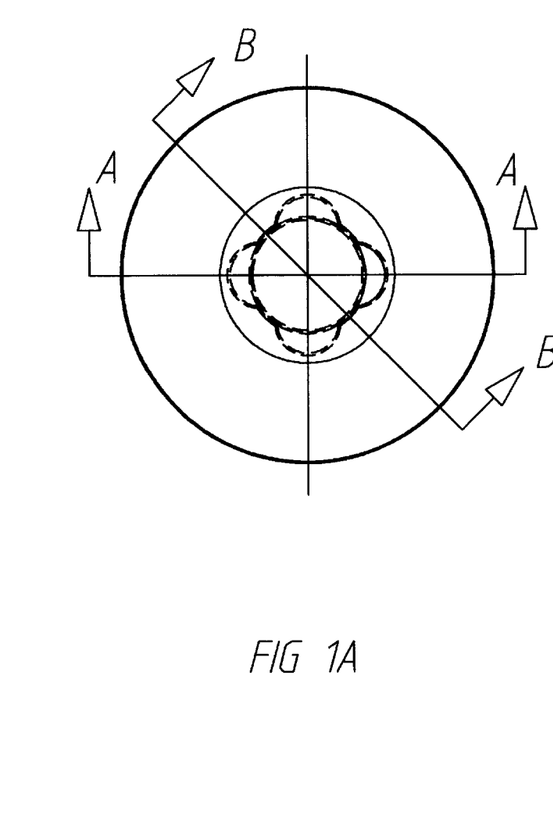
FIG. 1A is a top view of an insulated plant cover (10).
Figure 2:
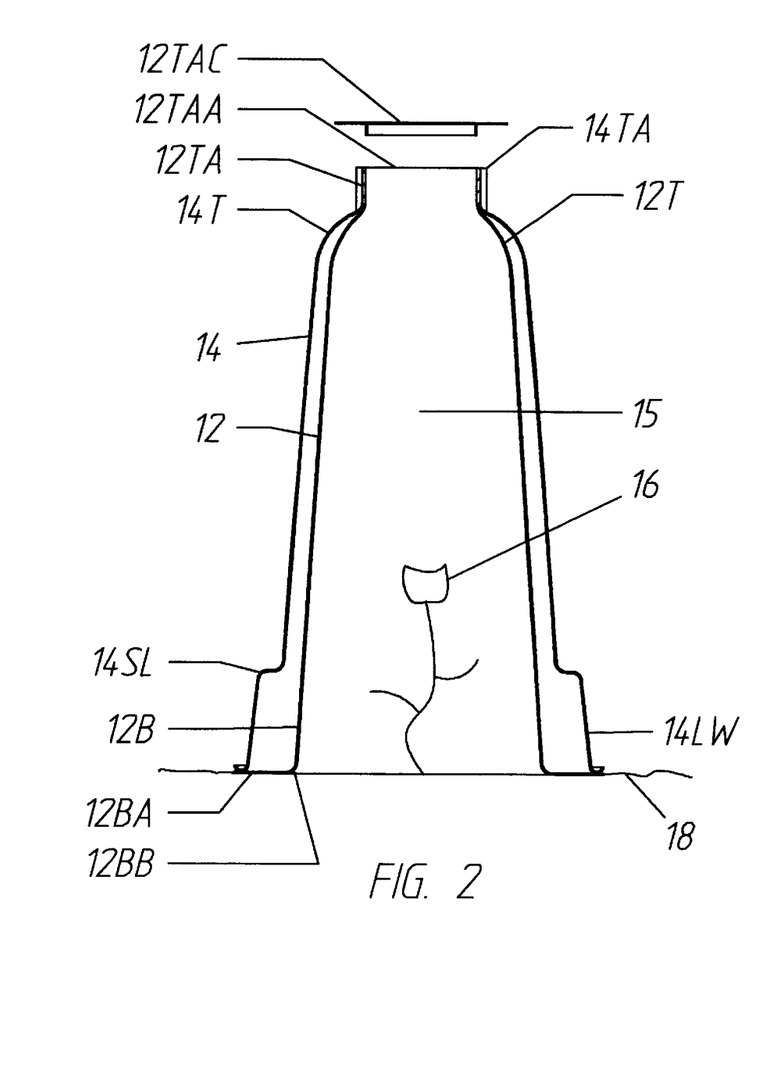
FIG. 2 is a side view of an inner cylinder.
Figure 2A:
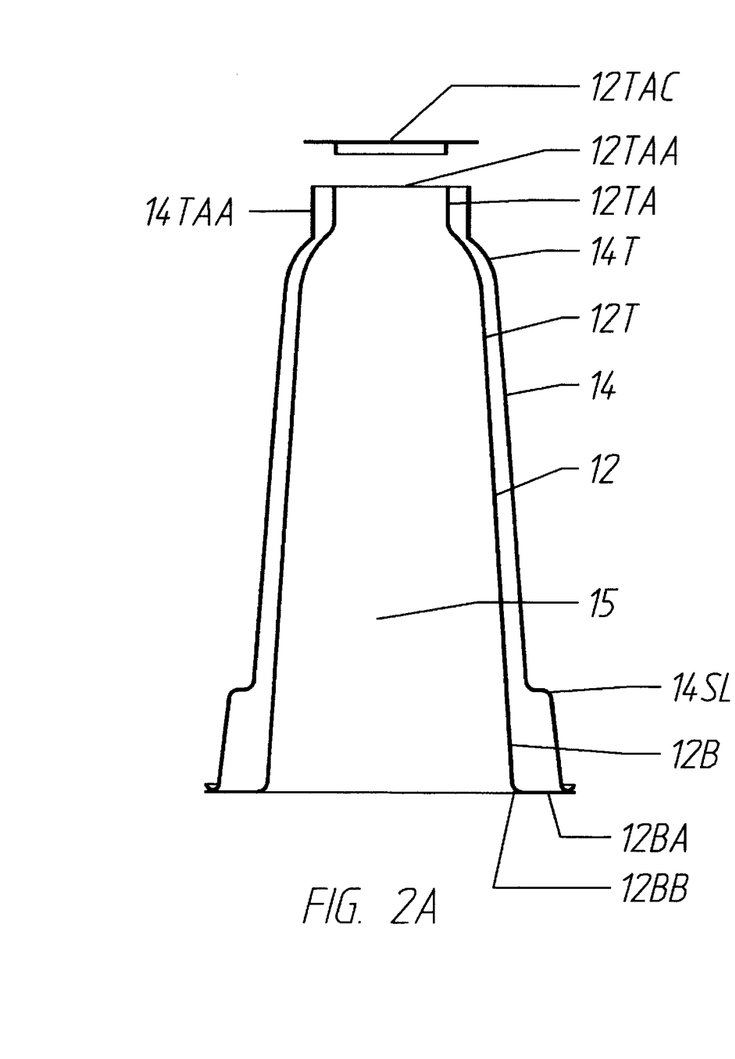
FIG. 2A is a cross-sectional view along line AA from FIG. 1A.
Figure 3:
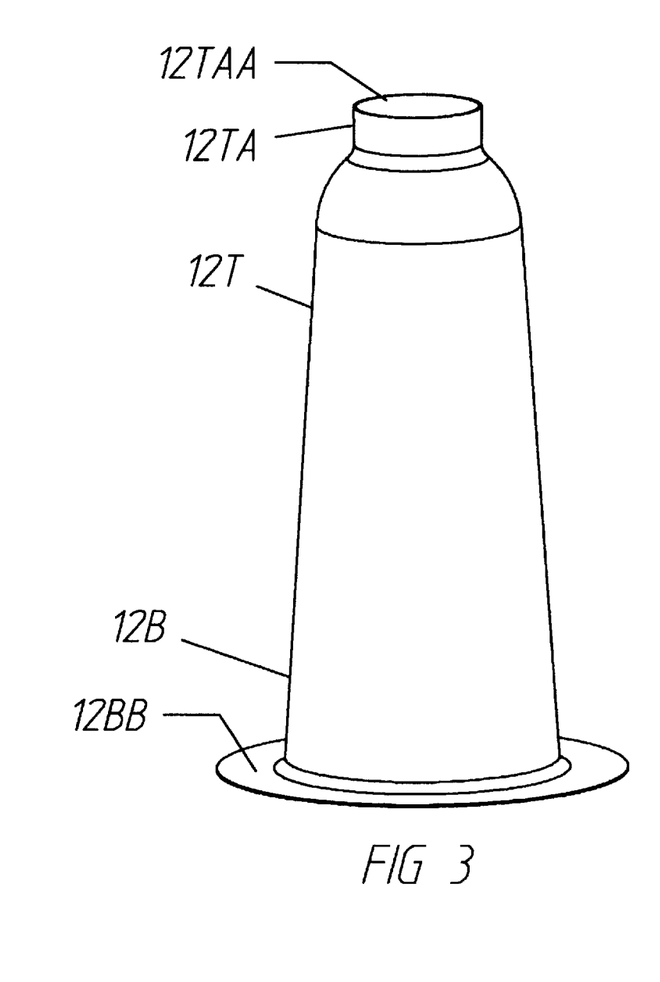
FIG. 3 is a side view of an insulated plant cover (10).
Figure 3A:
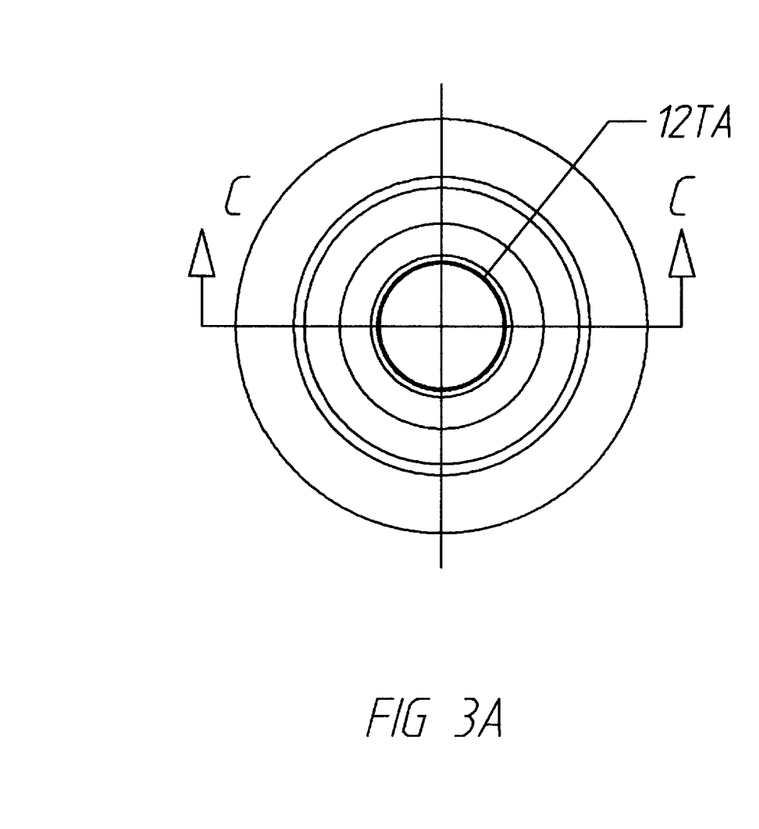
FIG. 3A is a side view of inner cylinder (12).
Figure 4:
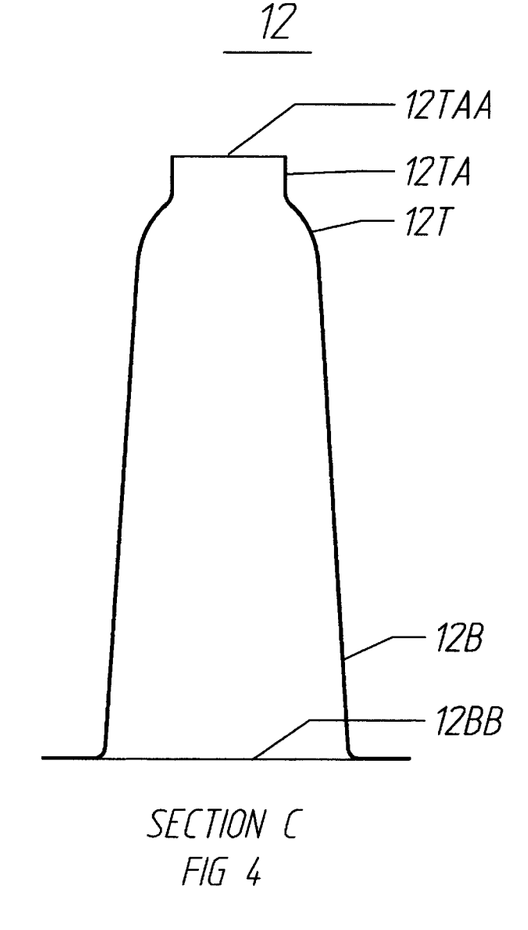
FIG. 4 is a cross-sectional view (C) of an inner cylinder (12) along line CC of FIG. 3A.
Figure 5:
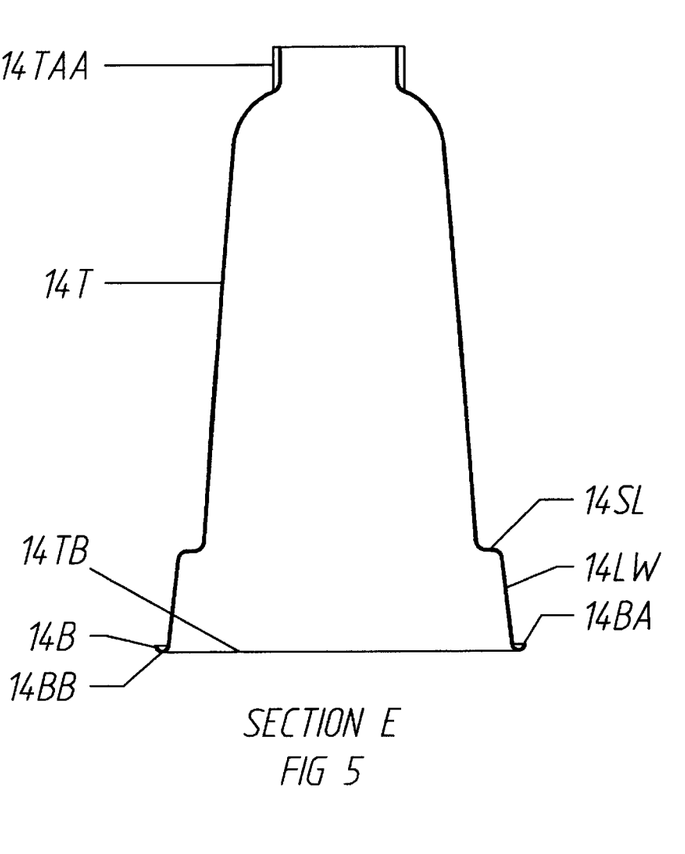
FIG. 5 is a cross-sectonal view (E) of an outer cylinder (14) along line EE of FIG. 6.
Figure 5A:
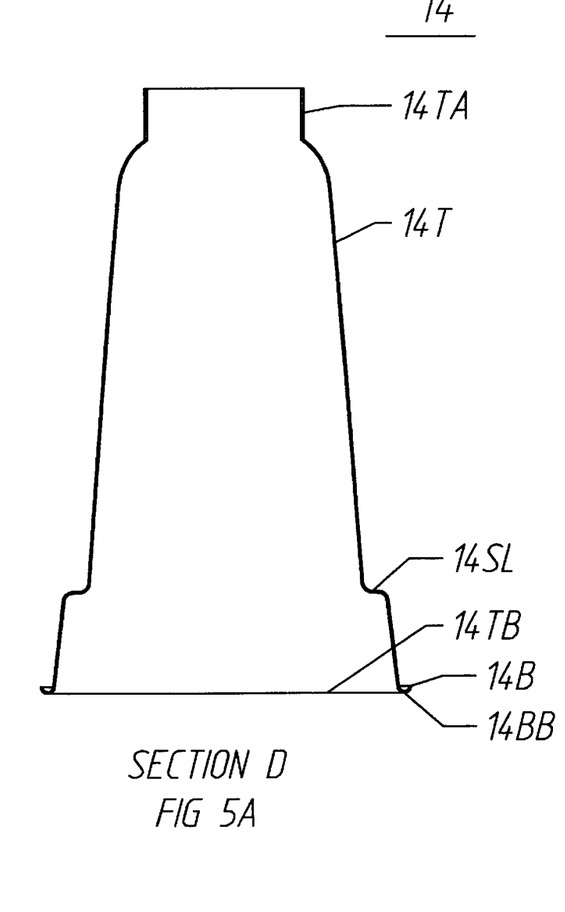
FIG. 5A is a cross-sectional view (D) of an outer cylinder (14) along line DD of FIG. 6.
Figure 6:
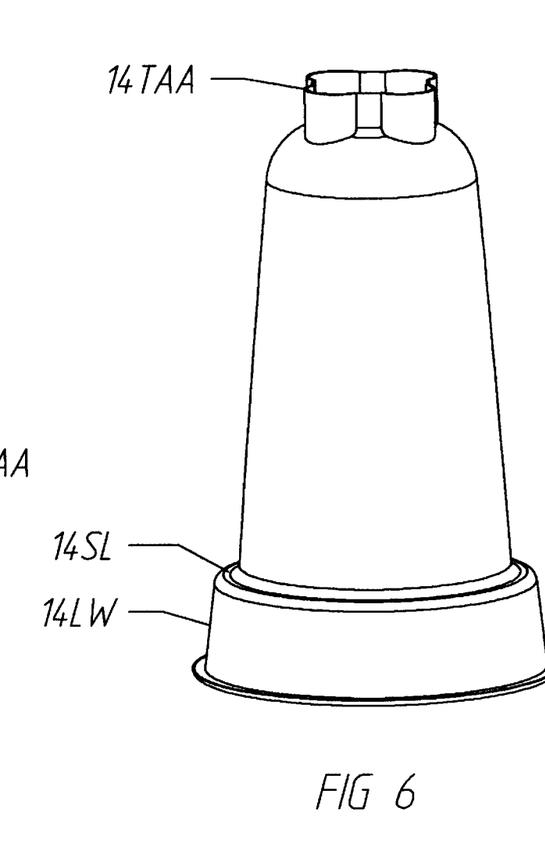
FIG. 6 is a side view of insulated plant cover (10).
Figure 6A:
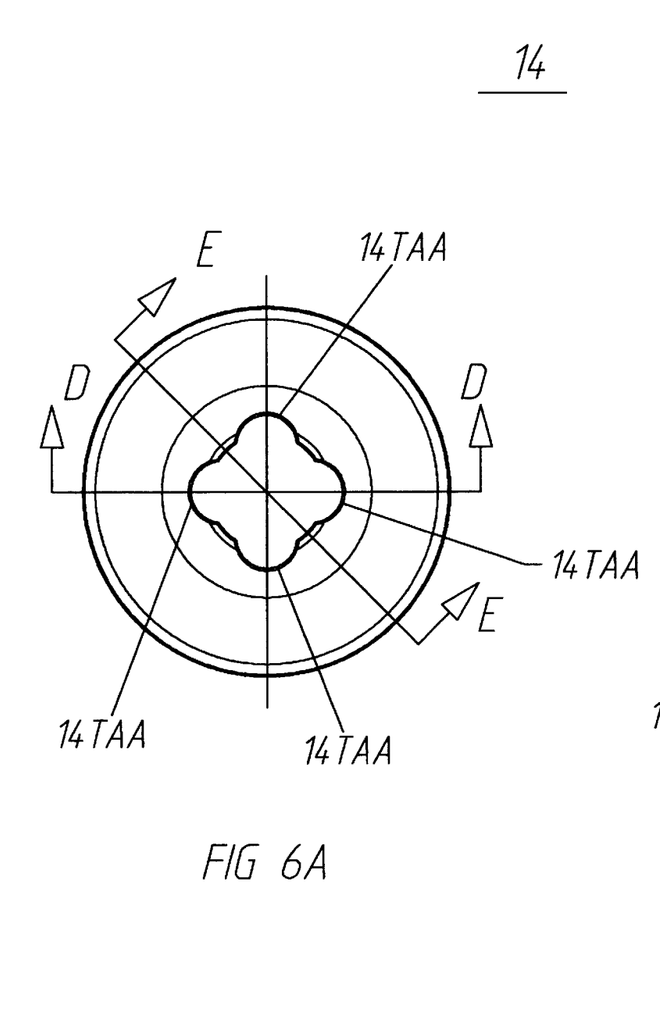
FIG. 6A is a top view of insulated plant cover (10).

Lastly, referring to FIG. 2 which is a cross-sectional view of an insulated plant cover (10) along line BB of FIG. 1A. The inner cylinder top (12T) further comprises an inner cylinder bottom edge (12BB) which positioned circumferentially along a bottom distal end of the inner cylinder top (12T). The outer cylinder bottom (14B) is sealably attached at a lower distal end to the inner cylinder bottom spacer (12BA). The inner cylinder bottom spacer (12BA) functions to separate the inner cylinder top (12T) and the outer cylinder bottom (14B) a preselected distance.

It will be understood that each of the elements described above, or two or more together, may also find a useful application in other types of constructions differing from the type described above.

While the invention has been illustrated and described as embodied in a insulated plant cover, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An insulated plant cover (10) comprising:

A) a transparent or translucent inner cylinder (12) which comprises an inner cylinder top (12T) and an inner cylinder bottom (12B), the inner cylinder top (12T) comprises an inner cylinder top chimney (12TA) positioned at a top distal end and an inner cylinder bottom spacer (12BA) positioned circumferentially along a bottom distal end, the inner cylinder bottom (12B) comprises an inner cylinder bottom edge (12BB) positioned circumferentially along a bottom distal end; and B) a transparent or translucent outer cylinder (14) which comprises an outer cylinder top (14T) and an outer cylinder bottom (14B), the outer cylinder top (14T) comprises an outer cylinder top upper edge (14TA) positioned circumferentially along a top distal end and an outer cylinder bottom lower edge (14TB) positioned circumferentially along a bottom distal end, the outer cylinder bottom lower edge (14TB) is sealably attached to the inner cylinder bottom spacer (12BA), the inner cylinder (12) is positioned within the outer cylinder (14), the inner cylinder bottom edge (12BB) is sealably attached to the inner cylinder bottom spacer (12BA), wherein the inner cylinder top chimney (12TA) extends above the upper edge of the outer cylinder top (14T) and said inner cylinder top chimney (12TA) comprises a circumferentially extending lip (12TAA) there around and further comprises an inner cylinder top chimney lid (12TAC) being releasably attachable to said inner cylinder top chimney (12TA), during use, the insulated plant cover (10) is removably positionable over a plant (16) having the inner cylinder bottom spacer (12BA) resting on a ground (18) for support.

2. The insulated plant cover (10) as described in claim 1, wherein the outer cylinder top upper edge (14TA) further comprises at least one outer cylinder top upper edge opening (14TAA) which functions to allow a user to add water between the inner cylinder (12) and the outer cylinder (14).

3. The insulated plant cover (10) as described in claim 1 is constructed from a trans parent or translucent material selected from a group consisting of glass, plastic and plastic composite.

* * * * *